May 19, 1936. W. H. CHADWICK Re. 19,976

PUBLICITY APPARATUS

Original Filed March 17, 1930

INVENTOR:
WILLIAM H. CHADWICK
BY James R. McKnight
ATTORNEY

Reissued May 19, 1936

Re. 19,976

UNITED STATES PATENT OFFICE 19,976

PUBLICITY APPARATUS

William H. Chadwick, Chicago, Ill.

Original No. 1,842,895, dated January 26, 1932, Serial No. 436,413, March 17, 1930. Application for reissue June 12, 1933, Serial No. 675,403

5 Claims. (Cl. 179—100.4)

The object of this invention is to provide a novel apparatus for publicity purposes, which apparatus, while usable in many different ways, is of particularly great value in connection with sales promotion work in department stores, exhibition halls and like places.

The apparatus consists of a number of loud speakers, a sound producer, an amplifier and an automatic distributor. If the apparatus is to be used, for instance, in a department store, the loud speakers are placed in the different departments; the sound producer, amplifier and distributor are placed in a separate room, such as the office of the sales manager; the sound producer is connected with the distributor through the amplifier; and the distributor is connected separately with each of the loud speakers.

In one embodiment of my invention, an automatic phonograph may be employed as the sound producer. In such a case the phonograph operates on a series of specially prepared records which contain short, interesting, snappy sales talks concerning the merchandise displayed in the different departments. The talks are preferably interspersed with musical selections to attract attention. The records are played automatically by the phonograph in a predetermined order, and the talk on any one record is transmitted to the particular loud speaker which is located in the department to which the talk pertains. After each record has been played, the phonograph causes the distributor to automatically switch to another loud speaker. The records are arranged according to subject matter in the same order as the switching is effected by the distributor, whereby to transmit each of the sales talks to the proper department for the same.

While the foregoing explanation is indicative in a general way of the nature of the invention, other objects and advantages will be apparent to those skilled in the art upon a full understanding of the construction, arrangement and operation of the apparatus.

One form of the invention is presented herein for the purpose of exemplification, but it will of course be appreciated that the invention is susceptible of embodiment in other more or less elaborate forms coming equally within the contemplated scope of the appended claims.

Figure 1:
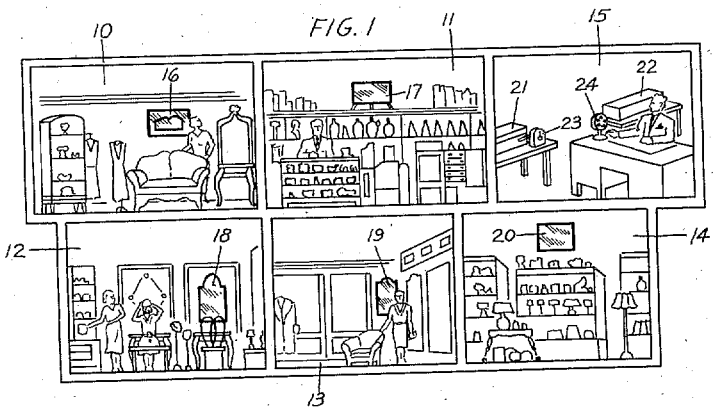
Fig. 1 is a schematic view intended to illustrate a number of different departments in a store, showing loud speakers installed in each of the departments and a sound producer, amplifier, distributor and microphone installed in a separate room.
Figure 2:
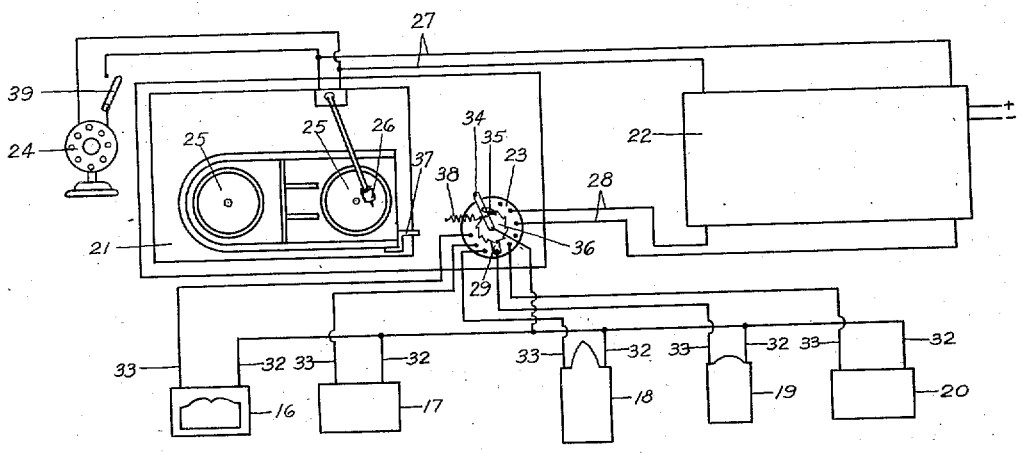
Fig. 2 is a diagrammatic view of the apparatus, illustrating the way in which the five loudspeakers shown in Fig. 1 are connected up for automatic operation with the sound producer, amplifier, distributor and microphone shown in Fig. 1.

In one embodiment of my invention the numerals 10, 11, 12, 13 and 14 in Fig. 1 designate different departments in a large store, and the numeral 15 designates the office of the sales manager of the store. As will be observed in Fig. 1, the departments are equipped with individual loud speakers 16, 17, 18, 19 and 20 which are preferably quite ornamental in appearance but may be concealed behind or made an inconspicuous part of a wall panel, mirror, picture or other object. The room 15, which is separate from the departments in which the loud speakers are installed, contains a sound producer such as an automatic phonograph, or any other suitable sound producing device, 21, an electrically operated sound amplifier 22 and an automatic distributor 23. It may also contain, as an adjunct to the apparatus, a microphone 24.

Where the phonograph is used for the sound producing device it is equipped with a number of sound records 25 and is adapted to play the records automatically, one after the other, in a predetermined order. The records 25, or whatever other means is used, contain carefully prepared sales talks concerning the merchandise displayed in the various departments in which the loud speakers are installed, and the sales talks are preferably interspersed with musical selections or other entertaining material to attract and hold the attention of shoppers passing through the departments. When the sound producer 21 is a phonograph it is a fully automatic machine, in the sense that it will position and play each of the records 25 in a predetermined order without manual control. The particular phonograph construction shown in Fig. 2 is similar to an automatic phonograph which is on the market at the present time, but the present invention is not in any way concerned with the details of construction of the phonograph, since any one of a large number of different automatic phonographs will serve the purposes of the invention equally well.

Figure 3:
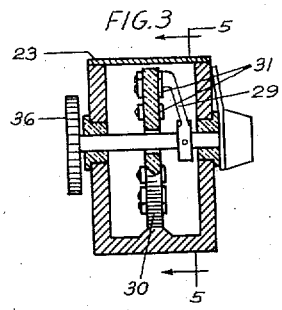
Fig. 3 is a vertical section through the distributor.
Figure 4:
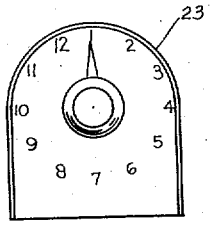
Fig. 4 is a front view thereof.
Figure 5:
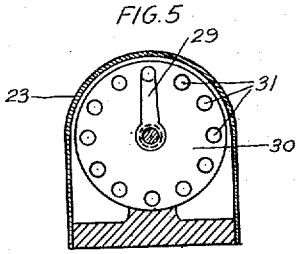
Fig. 5 is another vertical section through the distributor, taken on the line 5—5 of Fig. 3.

The reproducer 26 of the sound producer is connected electrically by wires 27 with the amplifier 22, and the amplifier is in turn connected electrically by wires 28 with the distributor 23, which distributor is shown in detail in Figs. 3, 4 and 5 and preferably includes a rotatable contact arm 29 and a stationary disk 30 having a plurality of circumferentially-spaced contact points 31. One of the wires 28 is connected with the contact arm 29, and the other is connected with each of the contact points 31. The contact arm 29 is connected to the loud speakers by wires 32, and the contact points 31 are each separately connected to the loud speakers by wires 33. The construction of the distributor is such that a lever 34 which is connected with the contact arm 29 through a pawl 35 and ratchet wheel 36 will be engaged by a reciprocating part 37 of the sound producer and will be swung against the resistance of a return spring 38 through an angle corresponding to the distance between adjacent contact points, whereby to move the contact arm 29 through a corresponding angle and cause the loud speaker previously operating to be disconnected from the sound producer and the next loud speaker to be connected up with the same ready to reproduce the sounds on the next record, or the like.

Should the sales manager or some other person desire to give a special talk for the benefit of the customers or employees in any particular department, he may do so by closing a switch 39, which switch connects the microphone 24 with the amplifier, distributor and loud speakers. During the period of such talk the sound producer may be shut off. If the talk concerns all of the departments, instead of only one, he may temporarily connect all of the loud speakers together for simultaneous operation, either by means of a special attachment on the distributor for that purpose or through the instrumentality of a separate interconnecting switch.

Instead of being used in different parts of a department store, exhibition hall, or school, as above described, the loud speakers may be installed in the show window of stores and operated either alone or in synchronism with other loud speakers installed in the departments handling the merchandise displayed in the windows.

The construction and electrical hook-up of the distributor with the other parts of the apparatus are minor features capable of considerable modification which any electrician with an understanding of the invention can work out satisfactorily in any one of a great many different ways.

As a modification, a moving picture projector can be associated with each of the loud speakers and operated in synchronism therewith.

From the foregoing description, it will be appreciated that the apparatus of the invention is of considerable value as an instrumentality for creating sales or giving publicity of any sort to the particular locations most likely to be favorably affected by the same, and that the range of use of the invention is practically unlimited.

Having thus described my invention I claim:

1. In an apparatus of the character described, in combination, an automatic phonograph for operation on a plurality of records containing sales talks or other publicity matter, an amplifier connected with the phonograph, a distributor connected with the amplifier, a plurality of loud speakers connected with the distributor, and means operable upon changing records for causing the distributor to automatically connect each of the loud speakers one or more at a time with the phonograph through the amplifier whereby to reproduce different matter through different loud speakers.

2. In an apparatus of the character described, in combination, an automatic phonograph for operation on a plurality of records containing sales talks or other publicity matter, a distributor connected with the phonograph, a plurality of loud speakers connected with the distributor, and means operable upon changing records for causing the distributor to automatically connect each of the loud speakers one or more at a time with the phonograph, whereby to reproduce different matter through different loud speakers.

3. In an apparatus of the character described, in combination, an automatic phonograph for operation on a plurality of records containing sales talks or other publicity matter, an amplifier connected with the phonograph, a distributor connected with the amplifier, a plurality of loud speakers connected with the distributor and means actuated automatically by the phonograph at the time of changing records for causing the distributor to automatically connect each of the loud speakers one or more at a time with the phonograph through the amplifier whereby to reproduce different matter through different loud speakers.

4. In an apparatus of the character described in combination, an automatic phonograph for operation on a plurality of records containing sales talks or other publicity matter, an amplifier connected with the phonograph, a distributor connected with the amplifier, a plurality of loud speakers connected with the distributor, means actuated automatically by the phonograph at the time of changing records for causing the distributor to automatically connect each of the loud speakers one or more at a time with the phonograph through the amplifier whereby to reproduce different matter through different loud speakers, and a microphone connected with the amplifier for optionally permitting reproduction of unrecorded talks through any or all of the loud speakers.

5. In an apparatus of the character described, in combination, an automatic phonograph for operation on a plurality of records containing sales talks or other publicity matter, an amplifier connected with the phonograph, a distributor connected with the amplifier, a plurality of loud speakers connected with the distributor, means actuated automatically by the phonograph at the time of changing records for causing the distributor to automatically connect each of the loud speakers one or more at a time with the phonograph through the amplifier whereby to reproduce different matter through different loud speakers, a microphone, and means actuatable manually by an operator for connecting the microphone with the amplifier to permit reproduction of unrecorded talks through any or all of the loud speakers.

WILLIAM H. CHADWICK.